J. L. LEAVITT.
WOODWORKING TOOL.
APPLICATION FILED JUNE 1, 1911.
1,017,774.
Patented Feb. 20, 1912.
2 SHEETS—SHEET 2.
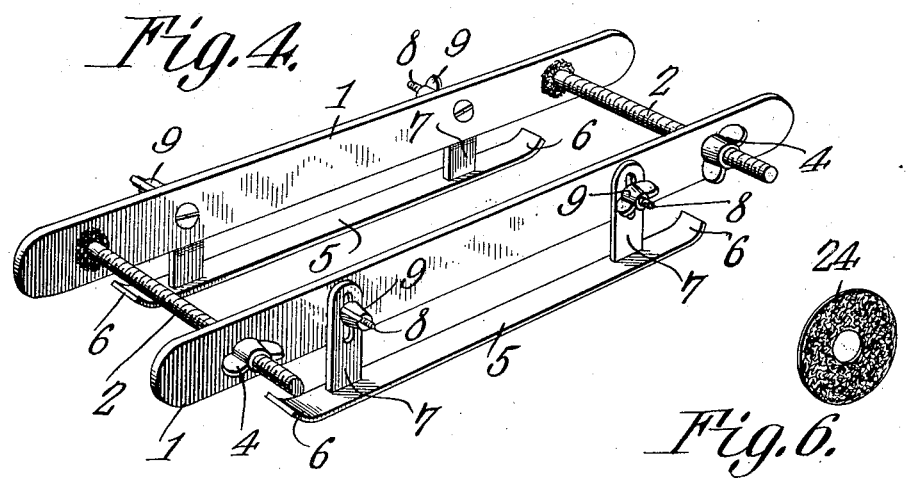
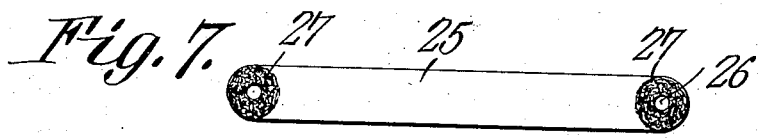
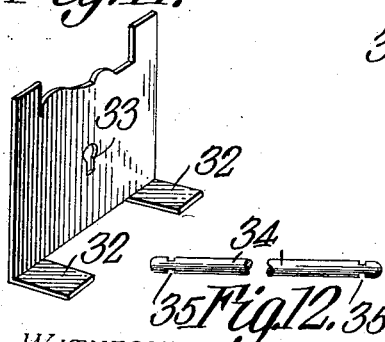
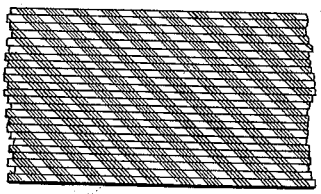
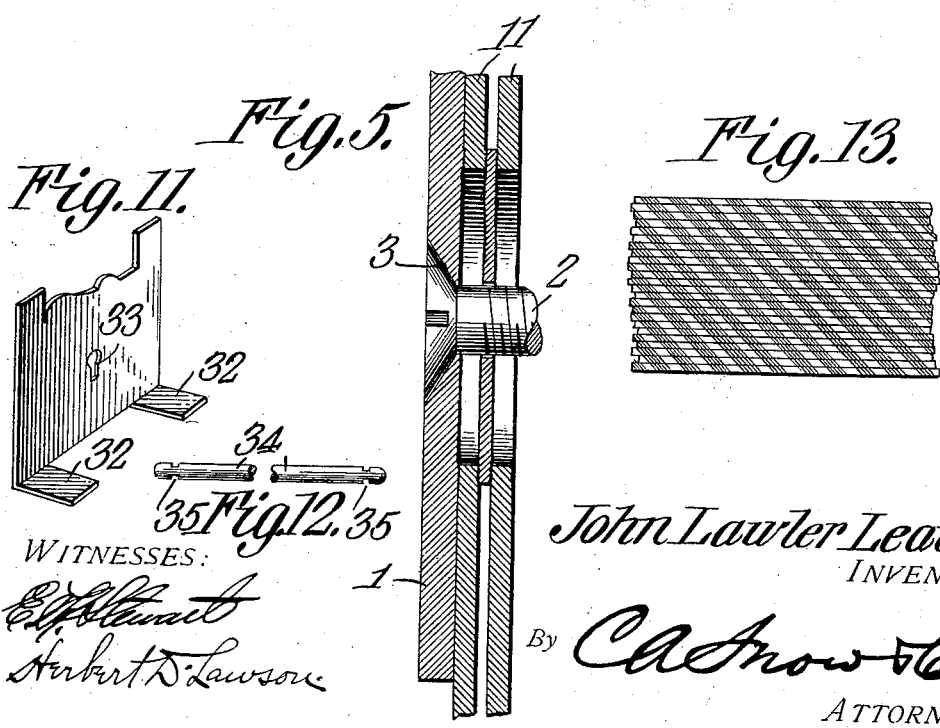
WITNESSES:
John Lawler Leavitt,
INVENTOR.
By C. A. Snow & Co.
ATTORNEYS

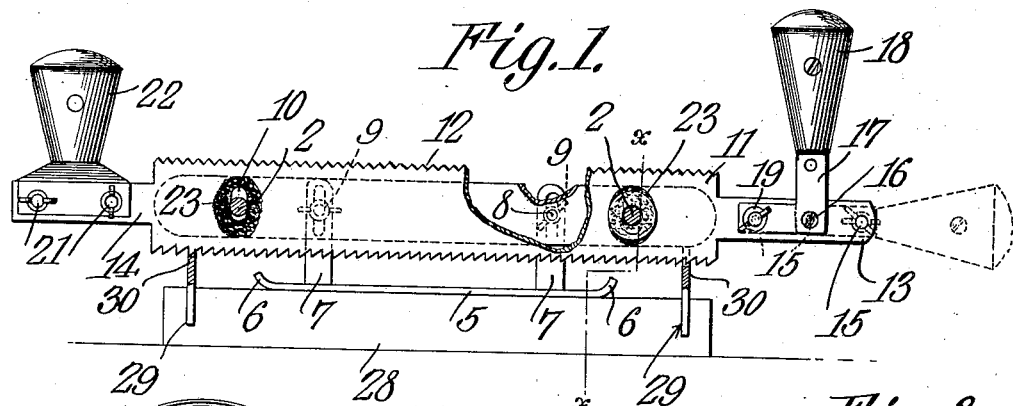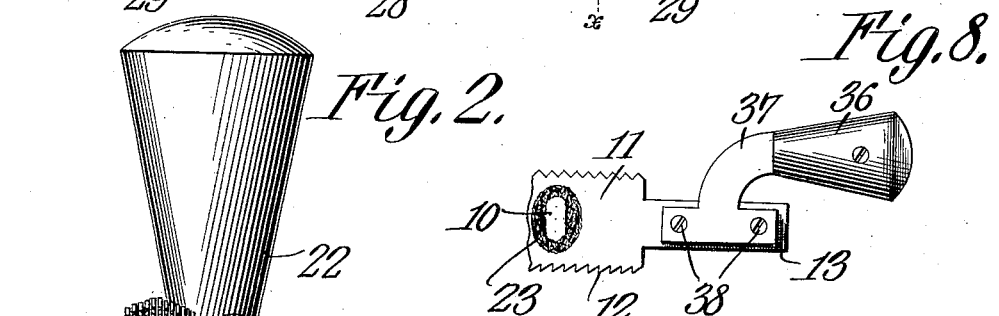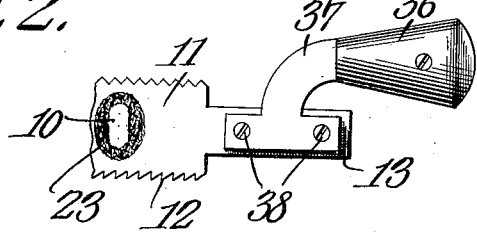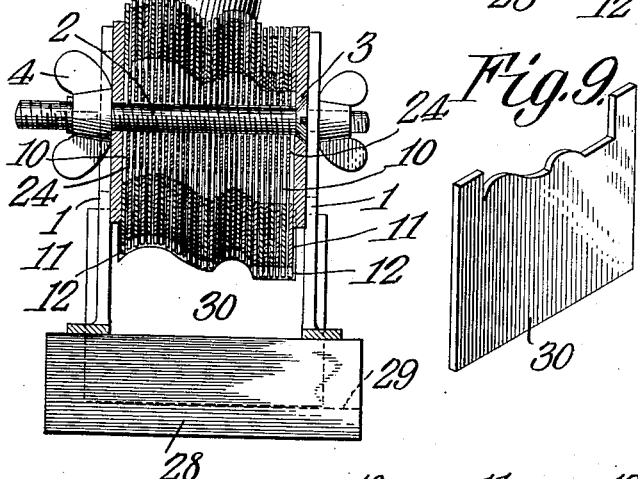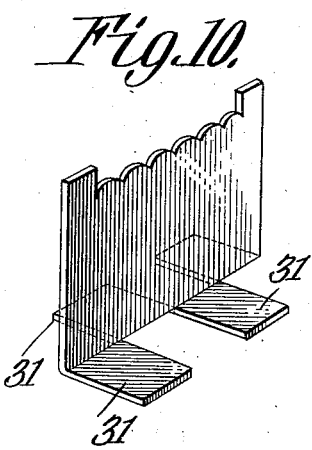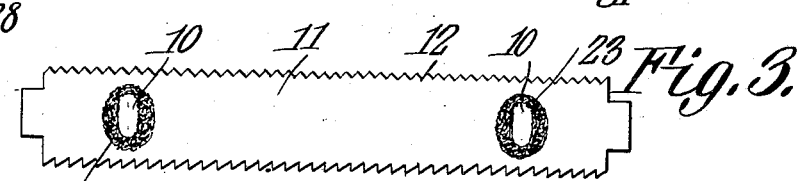

UNITED STATES PATENT OFFICE.

JOHN LAWLER LEAVITT, OF COPPERTON, NEW MEXICO.

WOODWORKING-TOOL.

1,017,774.  Specification of Letters Patent.  Patented Feb. 20, 1912.

Application filed June 1, 1911. Serial No. 630,719.

*To all whom it may concern:*

Be it known that I, JOHN LAWLER LEAVITT, a citizen of the United States, residing at Copperton, in the county of Valencia and State of New Mexico, have invented a new and useful Woodworking-Tool, of which the following is a specification.

This invention relates to woodworking tools and is designed as a cheap, durable and efficient substitute for rotary cutters, lathes, etc., used for producing molding, beads, etc., of wood.

A still further object is to provide a tool of this character which can be readily adjusted to produce surfaces of desired contours and which can be readily manipulated by hand.

Another object is to provide a novel arrangement of patterns whereby the device can be readily adjusted to produce desired results.

With these and other objects in view the invention consists of certain novel features of construction and combinations of parts which will be hereinafter more fully described and pointed out in the claim.

In the accompanying drawings is shown the preferred form of the invention.

In said drawings: Figure 1 is a longitudinal section through the tool the same being shown supported by a pattern; Fig. 2 is an enlarged section on line *x—x*, Fig. 1; Fig. 3 is an elevation of one of the series of blades constituting the tool; Fig. 4 is a perspective view of the frame of the tool; Fig. 5 is an enlarged section through one side of the frame and two of the adjoining blades and showing a spacing device interposed between the blades; Figs. 6 and 7 are detail views of the different forms of spacing devices; Fig. 8 is a side elevation showing a modified form of handle connected to one of the blades; Fig. 9 is a perspective view of one form of pattern for use with a holding block such as shown in Figs. 1 and 2; Fig. 10 is a similar view of a modified form of pattern; Fig. 11 is a perspective view of another form of pattern; Fig. 12 is a detail view of a connecting rod for use with the pattern shown in Fig. 11; and Fig. 13 is a plan view showing the manner of assembling the blades for the purpose of sharpening all of them simultaneously.

Referring to the figures by characters of reference, 1—1 are the side strips of the frame of the tool, said strips being connected by transverse bolts 2, the heads of which are fitted within countersunk openings 3 in one of the side strips, while the other ends thereof extend loosely through the other side strip and are engaged by wing nuts 4. Where the tool is to be used upon a broad flat surface it is desirable to provide the frame with guide strips or runners 5, the ends of which are upturned as shown at 6. These strips carry slotted standards 7 through which extend screws 8 projecting from the side strips 1 and engaged by nuts 9. By means of these nuts the standards may be clamped upon the strips 1 and in any positions to which they may be adjusted.

The bolts 2 extend through slots 10 formed transversely in the end portions of blades 11. These blades are of uniform lengths and provided along their edges with saw teeth 12. The center blade has tongues 13 and 14 extending through the ends thereof the tongue 13 being provided with a plurality of apertures 15. The central aperture receives a pivot 16 extending through the intermediate portion of an L-shaped arm 17. A handle 18 is secured to one end of this arm while the other end is adapted to be fastened to the tongue 13 by means of a bolt 19. An aperture 20 is formed in arm 17 near the handle so that by detaching the bolt 19 said handle can be swung into position shown by dotted lines in Fig. 1 and locked by inserting said bolt 19 through the outer end opening 15. The tongue 14 has apertures therein which receive bolts 21 for the purpose of securing a handle 22 to said tongue. The surface of each of the blades 11 is roughened adjacent the slots 10 as shown at 23 and these roughened portions are adapted to contact with the roughened faces of spacing washers 24 arranged on the bolts or of spacing strips 25. These spacing strips are adapted to be disposed longitudinally between the blades and have openings 26 to receive the bolts, the faces of said strips being roughened adjacent the openings as shown at 27.

As heretofore stated all of the blades are of the same size and proportions and the bolts 2 extend through them. It is obvious that by unscrewing the nuts 4 the blades can be moved with their cutting edges in any desired planes and then clamped in adjusted position by tightening the nuts 4.

In order that the cutting edges of the blades may be disposed so as to produce desired contours upon a block of wood or similar material patterns may be provided. These patterns may be of different forms and in Figs. 1 and 2, I have shown a pattern consisting of a base block 28 having top grooves 29 in the upper face thereof near its ends adapted to receive supporting strips 30 the upper edges of which are curved to indicate the contour which it is desired to produce with the tool. Strips 30 having edges of different contours may be used, the block 28 being designed to support different sets of strips 30. Instead of providing a holding block for the patterns each pattern may have ears 31 extending in opposite directions from the lower edge thereof sufficient distances to prevent the patterns from tilting when they are placed on a flat surface. Another form of pattern is shown in Fig. 11 wherein the ears 32 extend in one direction from the pattern and a keyhole slot 33 is formed in the pattern and adapted to receive one end of a rod 34 having grooves 35 adapted to receive the edges of the reduced portion of the slot. By connecting two patterns by means of this rod they will be held firmly together.

In order to reproduce the contour of the edges of the patterns, after the same have been set up the tool is adjusted by placing one cutting edge of each blade upon the upper edge of the pattern. By loosening the nuts 4 the blades will adjust themselves to the contour of the pattern after which said blades can be clamped together. After the tool has been adjusted the same is reciprocated upon the object to be shaped and will act as a rasp and cut away the wood to produce the desired contour. In reciprocating the tool the handle 18 is grasped in one hand while the other hand is placed upon the handle 22. Where the tool is used upon a floor or flat surface the runners 5 will be found desirable for the purpose of regulating the depth of the cut produced. Should the saws become dull they can be sharpened by drawing a file thereover at an angle of about forty-five degrees. This is permissible in view of the fact that the teeth of the saws are arranged along parallel lines extending at an angle of forty-five degrees, as shown in Fig. 13.

Instead of connecting the handle to the saw as shown in Fig. 1 the same may be fastened thereto, as in Fig. 8. By referring to this figure it will be noted that the handle 36 is not adjustably connected but instead has an angular arm 37 projecting therefrom which is fastened at two points to the tongue 13 as shown at 38. By providing the roughened surfaces upon the blades and upon the spacing devices there is no danger of the blades slipping out of adjusted position after they have been clamped together. It will be seen that with a device of this character molding of various contours can be very easily produced it being merely necessary to subsequently finish it with sand paper or the like. It is even possible to produce beads, etc., upon cylindrical objects such as table legs by mounting said objects so that they can be rotated and resting the tool transversely thereon. By providing teeth along opposite edges of the blades upon reversing the tool surfaces can be formed, the contours of which are the reverse of the patterns.

It will be noted by referring to the drawings that the teeth along one edge of each blade are for cutting across the grain of wood while the teeth upon the other edge of each blade are for cutting with the grain. It will therefore be apparent that the tool can be used as effectually when cutting either in the direction of the grain of the wood or transversely of the grain.

While the saws have been shown with two kinds of teeth arranged upon the respective edges thereof, it is usually intended to provide the same kind of teeth upon both edges so that the tool can be quickly reversed and either set of teeth employed. As the device is primarily designed for molding wood transversely of the grain, the teeth will be usually so shaped as to cut across grain.

While washers are preferably used between the blades, it is to be understood that they can be dispensed with if so desired.

Instead of using a pattern such as described, ordinary molding may be employed for setting the blades in proper relation to each other.

Under some conditions a side gage will be found desirable, such gage usually being in the form of a blank saw blade arranged along one side of the tool and extending below the toothed blades.

It is to be understood that the blades of the tool can be held in the frame while they are being filed.

What is claimed is:

A woodworking tool including adjustably connected parallel blades having teeth along the upper and lower edges thereof, there being transverse slots in the end portions of the blades, spacing elements interposed between the blades, means extending through the slots and spacing devices for securing the blades together to prevent relative movement thereof, tongues extending in opposite directions from one of the blades, and handles secured to the tongues.

In testimony that I claim the foregoing as my own, I have hereto affixed my signature in the presence of two witnesses.

JOHN LAWLER LEAVITT.

Witnesses:
  JOHN DAY,
  LEONARD HAYTON.

---

Copies of this patent may be obtained for five cents each, by addressing the "Commissioner of Patents, Washington, D. C."